(12) United States Patent
Friggstad

(10) Patent No.: US 6,374,921 B1
(45) Date of Patent: Apr. 23, 2002

(54) BI-FOLD IMPLEMENT FRAME

(75) Inventor: Terrance A. Friggstad, Grasswood (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/705,896

(22) Filed: Nov. 6, 2000

Related U.S. Application Data

(63) Continuation-in-part of application No. 09/214,630, filed as application No. PCT/CA97/00469 on Jul. 2, 1997, now abandoned.

(30) Foreign Application Priority Data

Jul. 2, 1996 (GB) .............................................. 9613873

(51) Int. Cl.[7] .............................................. A01B 59/00
(52) U.S. Cl. ...................... 172/311; 172/455; 172/482; 172/630; 172/654
(58) Field of Search ................................ 172/776, 310, 172/311, 322, 456, 383, 481, 669, 672, 458, 482, 630, 632, 633, 654, 662, 452

(56) References Cited

U.S. PATENT DOCUMENTS

| | | | | | |
|---|---|---|---|---|---|
| 3,122,210 | A | * | 2/1964 | French ........................ | 172/456 |
| 3,654,999 | A | * | 4/1972 | Fischer ........................ | 172/311 |
| 4,552,375 | A | * | 11/1985 | Kinzenbaw ............. | 280/415 R |
| 4,660,651 | A | * | 4/1987 | Pfenninger et al. ......... | 712/311 |
| 4,763,915 | A | * | 8/1988 | Risser ........................ | 172/311 |
| 4,945,997 | A | * | 8/1990 | Adee ........................... | 172/311 |
| 5,488,996 | A | * | 2/1996 | Barry et al. ................. | 172/311 |
| 5,524,712 | A | | 6/1996 | Balmer ........................ | 172/311 |
| 5,660,237 | A | * | 8/1997 | Boyko et al. ............... | 172/311 |
| 6,260,630 | B1 | * | 7/2001 | Friggstad .................... | 172/311 |

FOREIGN PATENT DOCUMENTS

| | | |
|---|---|---|
| CA | 1082035 | 7/1980 |
| CA | 1087903 | 10/1980 |

* cited by examiner

Primary Examiner—Robert E. Pezzuto
Assistant Examiner—Nathan Mammen
(74) Attorney, Agent, or Firm—Larry W. Miller; John William Stader

(57) ABSTRACT

A frame for a tillage implement includes a pair of opposing frame sections pivotally connected to a central kingpost for a folding movement between a transversely extending working position and a longitudinally extending transport position. The frame sections have mounted thereto a number of tool sub-frames carrying ground engaging working tools. The tool sub-frames are pivotally movable relative to a rockshaft carried by the frame sections so as to be rotatable between a lowered operative position and a generally vertical raised non-working position. Depth control for the ground engaging tools is accomplished through the rotation of the rockshaft about its pivot lug. The frame sections are connected at the inner end to the kingpost so that the main frame members abut when placed in the working position. Each frame member is supported by a pair of wheel assemblies at the inner and distal ends respectively. The inner wheel assemblies of each frame section is steered by a link connecting the wheel spindle to the hitch member to control the orientation thereof.

17 Claims, 8 Drawing Sheets

BI-FOLD IMPLEMENT FRAME

This application is a continuation-in-part (CIP) of application Ser. No. 09/214,630 Filed on Dec. 30,1998 (abandoned), which is a 371 of PCT/CA97/00469, filed Jul. 2, 1997, which claims priority to GB 1996/0013873, filed Jul. 2,1996.

BACKGROUND OF THE INVENTION

Modern farmers strive to improve the management of increasing amounts of farm acres. Improving management requires farmers to be able to quickly prepare the soil for each season's farming operations. This haste has driven the need for more efficient and larger farming equipment.

Implements such as harrows, packers, or combined harrow-packers were some of the earliest implements to be made with widths exceeding sixty feet in the field operating position. As tractor horsepower has increased over time, larger tillage implements have been made available. These larger implements require a mechanism for compactly folding the implement for practical and safe transport over the highway. U.S. Pat. No. 4,821,809, patented by Summach et al., discloses a convenient mechanism for such folding.

The conventional method of folding tillage implements is by folding wing sections along forward aligned axes such that the wings are folded to a generally upright position. Double folding wing sections may have outer sections that fold inwardly and downwardly from the ends of inner wing sections in five section winged implements. In the case of these conventional wing implements, the minimum implement width that can be achieved by such folding is limited by the width of the center section. As a result, road transport may still be somewhat restricted as these implements often exceed twenty feet or more in transport width.

Road transport standards in North America are beginning to follow the standards set in Europe in which maximum road transport widths and heights for agricultural implements are being defined. Large implements that have conventional folding wing sections are not able to be folded such that they fall within width and height limits that may be generally 3 meters wide and 4 meters high. Some U.S. states have adopted transport width limits of 13.5 ft.

Forward or rear folding implements provide some relief with respect to such transport limits. However, implements must also be made to function with the accurate seeding ability that conventionally folded implements have become capable of. Although some rear or forward folding multibar tillage implements have been developed, they do not demonstrate the accurate depth control required for farming operations.

One problem is that a tillage-packer combination for drill seeding requires the gang supporting tillage elements to be maintained parallel to the ground through a range of adjustable operating levels. The drawbar disclosed in Summach '809 raises or lowers the first attached gang of elements in a rotatable manner through its field and transport ranges of motion. A level manner of height adjustment is required for tillage elements.

Another problem that must be overcome for compact folding is the avoidance of the packer elements of the second gang striking the tillage elements of the first gang when raised to the transport position. If compact folding is not required, then the downward rotation of the suspended second gang may be limited so as not to impact the elements of the first gang. But when compact folding is desired, the elements of the second gang are in direct alignment with the ground elements of the first gang so that alignment is achieved.

SUMMARY OF THE INVENTION

It is an object of the invention to provide a compact folding multibar implement capable of accurate depth control in field working positions.

It is another object of the invention to provide a compact folding implement capable of being configured either as a multibar implement or as a single bar implement for row crop applications, thereby providing economy in manufacturing.

One key advantage of this style of folding is that for a harrow-packer combined implement, the packers are pulled inward toward the implement frame substantially before they are lifted from the ground, which significantly reduces the torsion required of the toolbar or frame elements in order to produce sufficient lifting force to effect compact folding.

The invention provides a farm implement frame which includes multiple elongated generally planar and horizontal frame sections to which individual ground working tools may be mounted. The frame sections extend transverse to the direction of travel when in the working position and include spaced apart members extending generally in the direction of travel when in the transport position. A hitch member connects the implement to a tractor or other motive source at the center of the frame sections. Each frame member includes an inner end and a distal end connected together at their respective inner ends by a main pivotal connection adjacent the forward members. The pivotal connection defines a generally vertical axis so that the inner ends of the frame sections abut one another in the working position. The frame sections are separately supported above the ground by a first set of wheels adjacent the inner end of the rearward members. The frame sections are also supported by the hitch members and by a second set of wheels adjacent to each distal end, so as to remain generally parallel to the ground in the working position. Preferably one set of wheels caster and one set of wheels is steered.

It is an advantage of the invention that the combination of a set of castering wheels at the outer end of the frame assemblies and a set of steered wheels at the inner end of the frame assemblies provides enhanced stability.

The invention further provides hydraulic cylinders operable between the frame sections to move the sections between the working position and the transport position. A tongue member extends rearwardly of the pivot connection to anchor the hydraulic cylinder for moving the frame sections.

The invention also provides a pair of hydraulic cylinders connected to the rearward members of the frame sections. The frame sections include upper and lower members adjacent their respective inner ends.

The invention further provides hitch members which are pivotally connected together at a forward end adjacent the tractor and pivotally connected to the frame sections about a generally vertical axis. The hitch members include locking means operable in the transport position to maintain the frame sections generally parallel to the direction of travel. The hitch members have no separate wheel support.

The invention also provides rockshafts pivotally attached to respective rearward members for movement about an axis parallel to and rearward of the frame section when in the working position. The rockshafts are adapted to carry tool sub-frame sections pivotally attached to a respective rockshaft for motion between a generally horizontal working position and a generally upright transport position. Tool hydraulic cylinders between the rockshafts and the tool sub-frame sections operate to control their respective relative rotational movement about the rockshaft to accommodate undulations in the ground when in the working position.

The tool sub-frames may be shaped as a parallelogram to extend at a substantial non-right angle to the rockshaft and carry wheeled support members rearward of the tool sub-frames when in the working position. The wheeled support members include a connecting apparatus between the tool sub-frames and the rockshaft to control their respective positions. The connecting apparatus is operable to provide a working position in which each of the tool sub-frames are substantially parallel to and spaced above the ground by a variable amount and is further operable to reduce the height of the wheel support members above the ground when the tool sub-frames are raised to a substantially vertical position for transport.

These and other objects, features, and advantages are accomplished according to the present invention by providing a frame for a tillage implement including a pair of opposing frame sections pivotally connected to a central kingpost for a folding movement between a transversely extending working position and a longitudinally extending transport position. The frame sections have mounted thereto a number of tool sub-frames carrying ground engaging working tools. The tool sub-frames are pivotally movable relative to a rockshaft carried by the frame sections so as to be rotatable between a lowered operative position and a generally vertical raised non-working position. The frame sections are connected at the inner end to the kingpost so that the main frame members abut when placed in the working position. Each frame member is supported by a pair of wheel assemblies at the inner and distal ends respectively. The inner wheel assemblies of each frame section is steered by a link connecting the wheel spindle to the hitch member to control the orientation thereof.

BRIEF DESCRIPTION OF THE DRAWINGS

The advantage of the present invention can be seen with reference to the following drawings wherein.

DETAILED DESCRIPTION OF THE PREFERRED EMBODIMENTS

Referring now to FIGS. 1–8, the details of the present invention can best be seen. Left and right references are used as a matter of convenience, and are determined by standing at the rear of the implement facing the tractor attached thereto and looking in the direction of travel.

Figure 1:
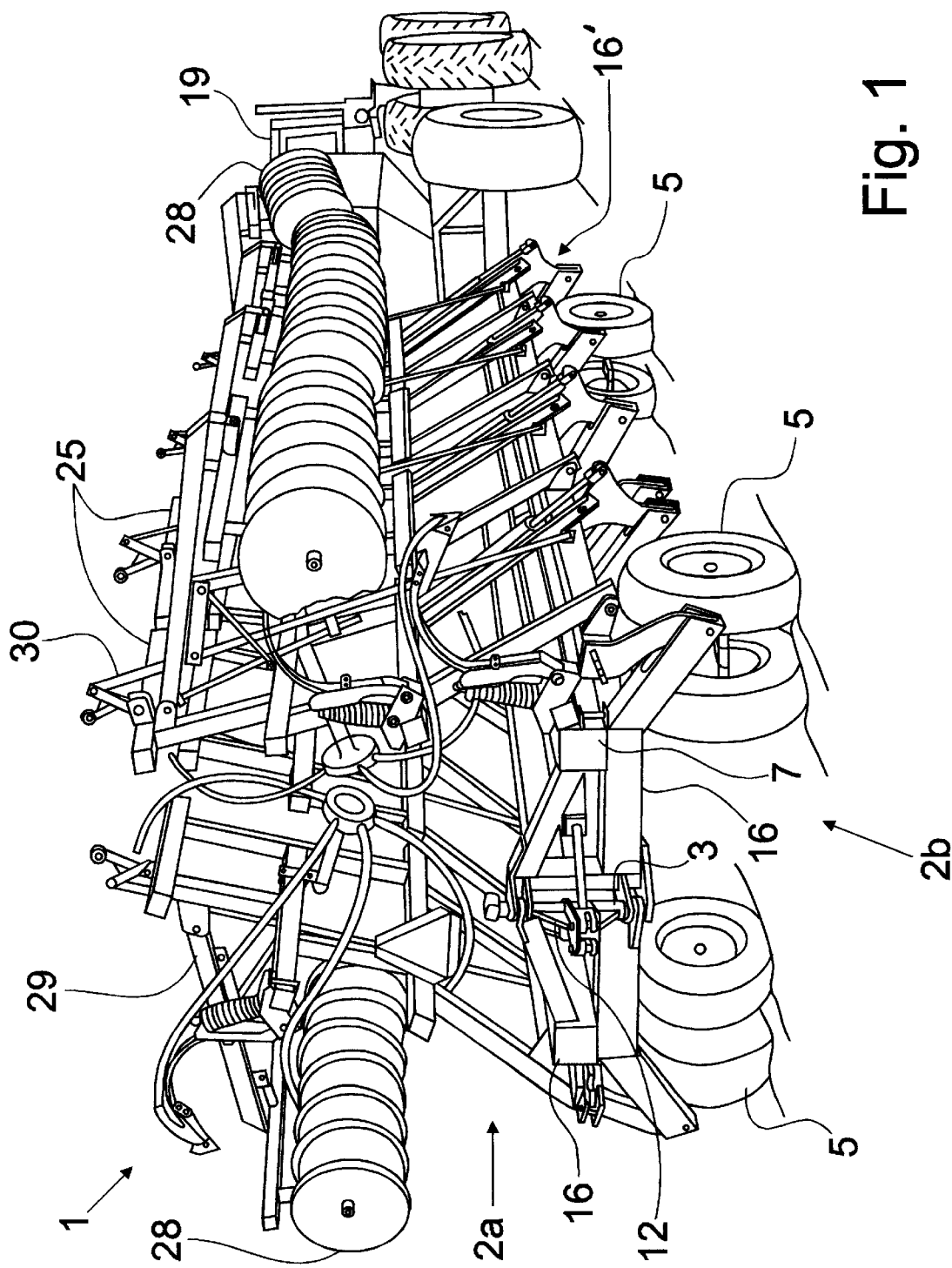
FIG. 1 is a right rear perspective view of a tillage implement incorporating the principles of the present invention, the implement being oriented in a transport position with the tool sub-frames being elevated and the frame sections being folded forwardly, the implement being connected to a tractor as a source of motive power.

The tillage implement 1 includes elongated frame sections 2a, 2b pivotally connected to a central rear kingpost 3. The frame sections 2a, 2b are pivotally movable between a transversely extending working position, shown best in FIG. 8, and a longitudinally extending transport position, as best seen in FIG. 1. Accordingly, the frame sections 2a, 2b are folded to be generally aligned with the direction of travel when in the transport position. Each frame section is independently supported above the ground by a pair of wheel assemblies 5 mounted, respectively, at the inner kingpost end 16 and at the outer distal end 16'. Preferably, the wheel assembly 5 at the inner kingpost end 16 is steered so as to control the orientation thereof relative to being in the transport or working positions. The wheel assembly 5 at the outer distal end 16' may be castered.

Figure 8:
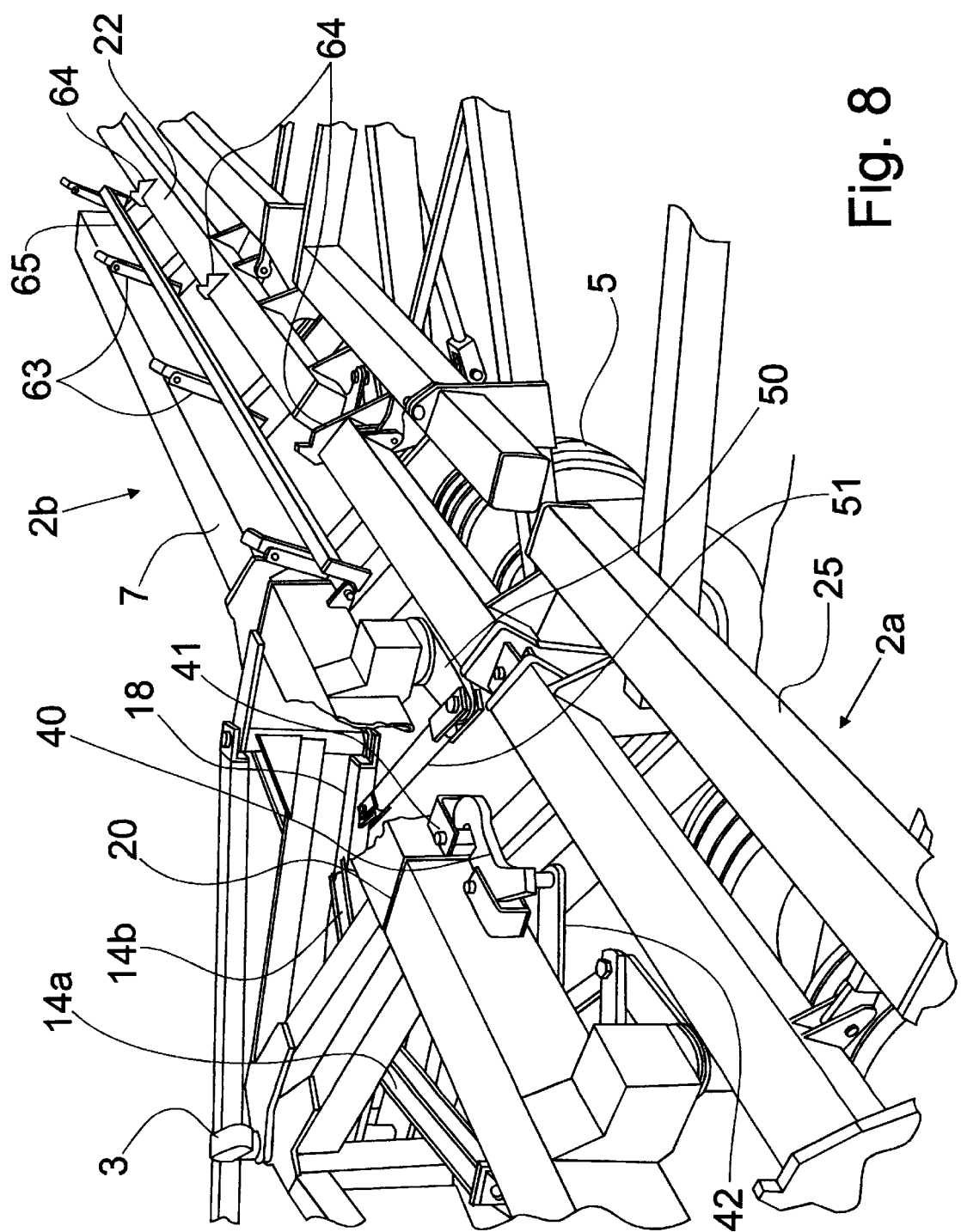
FIG. 8 is a partial upper left perspective view of the tillage implement with the tool frames and tool sub-frames in the working position, the frame sections being abutted, a central portion of the right main from being broken away for purposes of clarity.

As best seen in FIG. 8, the main frame members 7 of the frame sections 2a, 2b are latched together when in the working position by a latch mechanism having a latch bar 41 on frame section 2b and a latch hook 40 on the frame section 2a. The latch hook 40 is operatively connected by a link 42 to the hydraulic fold cylinder 14a to effect operation thereof in response to the movement of the hydraulic fold cylinder 14a to pivotally move the frame sections 2a, 2b between the transport and working positions. The wheel assembly 5 at the inner kingpost end 16 is steered by a link 51 interconnecting the hitch member 18 and a mounting arm 50 extending outwardly from the spindle of the wheel assembly 5. The link 51 provides a fixed distance between the mounting arm 50 and the connecting point with the hitch member 18 to keep the wheel assembly 5 oriented therewith. As a result, the wheel assembly 5 at the inner kingpost end 16 is pivotally moved relative to the respective frame section 2a, 2b when moving between the transport and working positions. The castering of the wheel assembly 5 at the outer distal end 16' of each frame section 2a, 2b does not require pivotal control.

Figure 5:
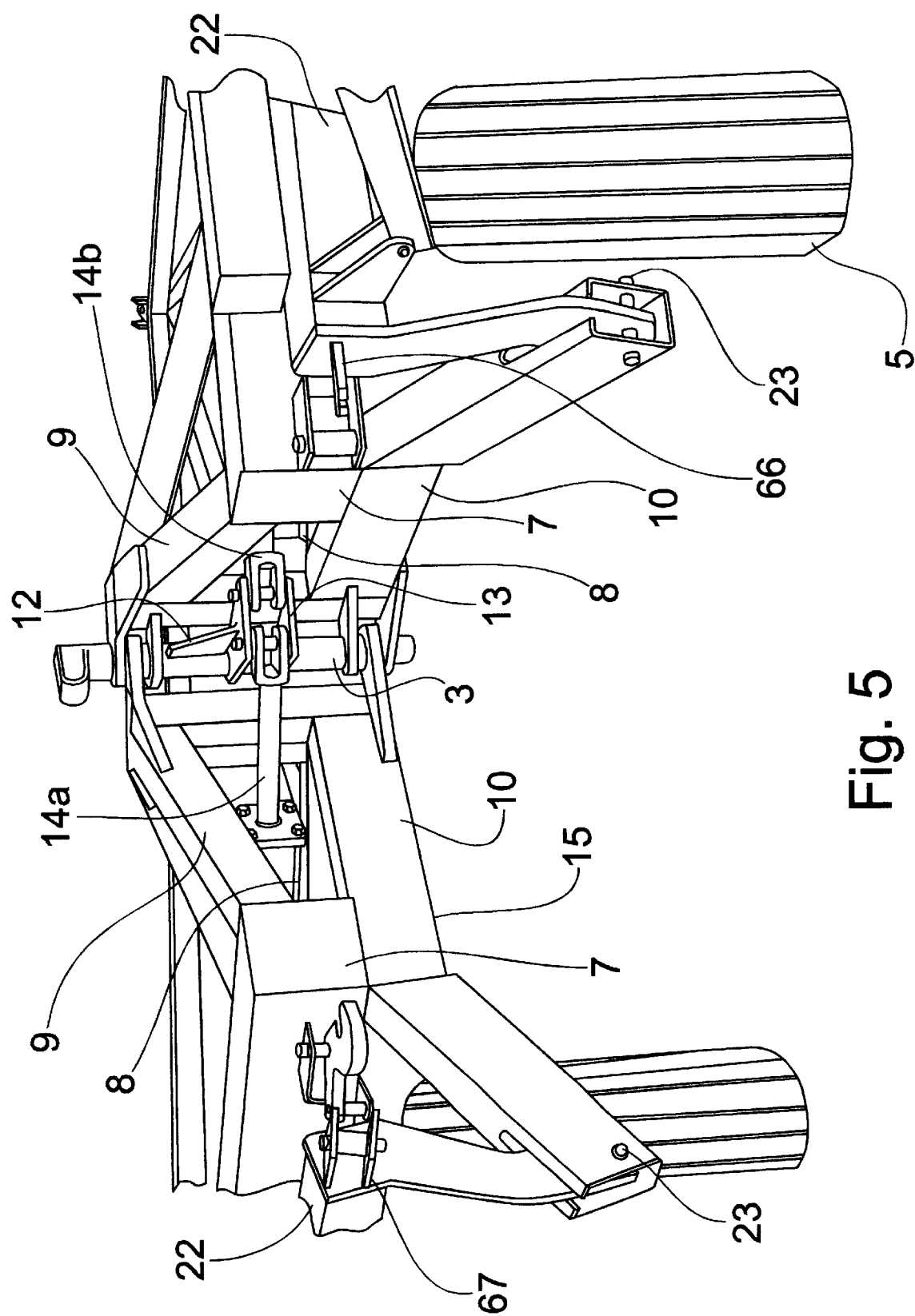
FIG. 5 is an enlarged partial rear elevational view of the tillage implement as shown in FIG. 4.
Figure 7:
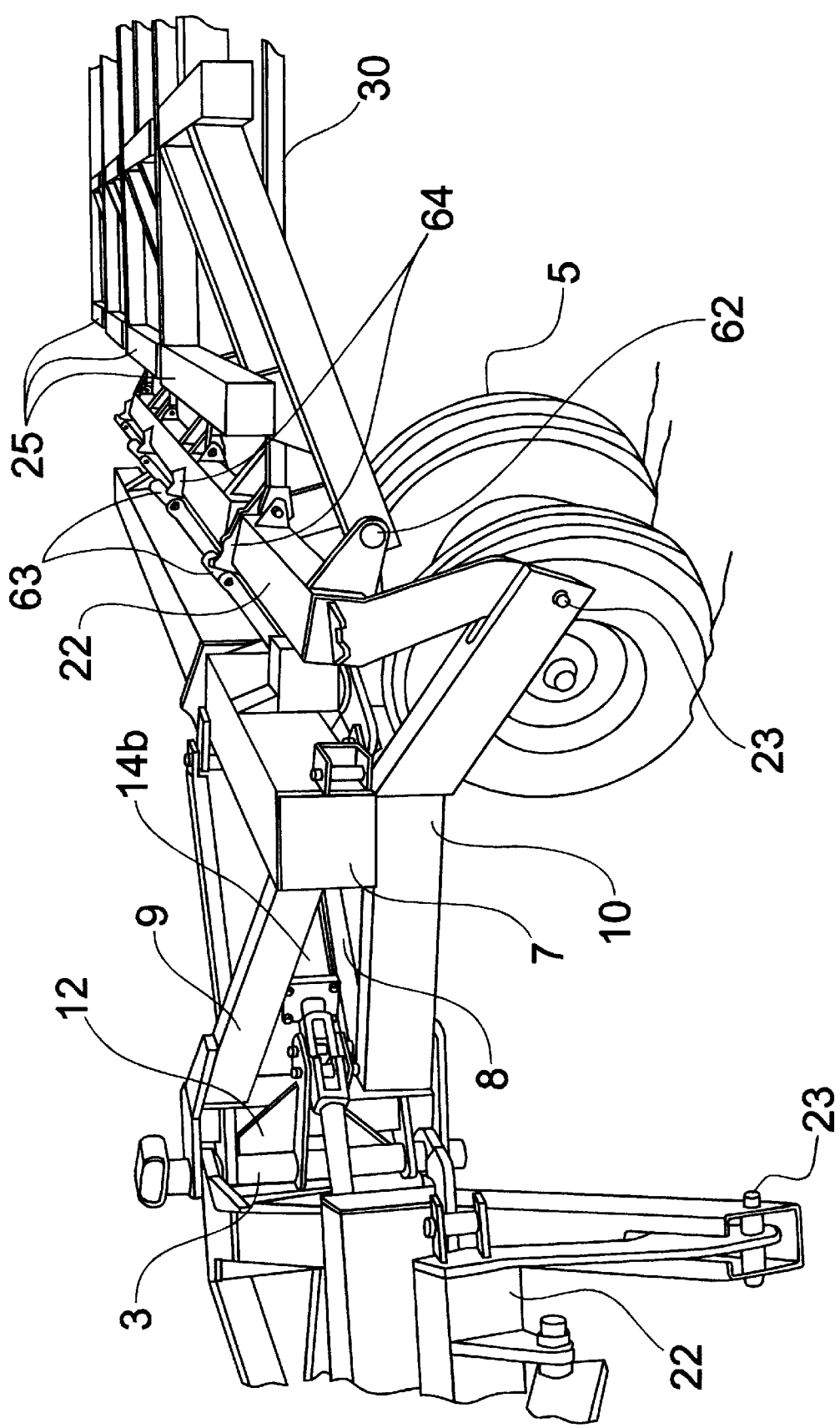
FIG. 7 is a partial left side perspective view of the right frame section with the tool sub-frames elevated above the ground and the frame sections being partially folded toward the transport position.

Each frame section 2a, 2b includes an elongated main frame member 7 and an elongated secondary frame member 8 positioned forwardly of the main frame member 7 when in the working position. The main frame member 7 and the secondary frame member 8 are substantially spaced apart as shown in FIGS. 5 and 7 and are interconnected by an end frame assembly 10. The end frame assembly 10 spaces the kingpost 3 from the wheel assembly 5 at the end 16 of the respective frame section 2a, 2b to provide stability in transport as the aspect ratio of the pair of frame sections 2a, 2b joined together at the kingpost 3 is reduced by a factor of 4 while the width of the implement 1 is narrow enough for transport over a highway.

Figure 2:
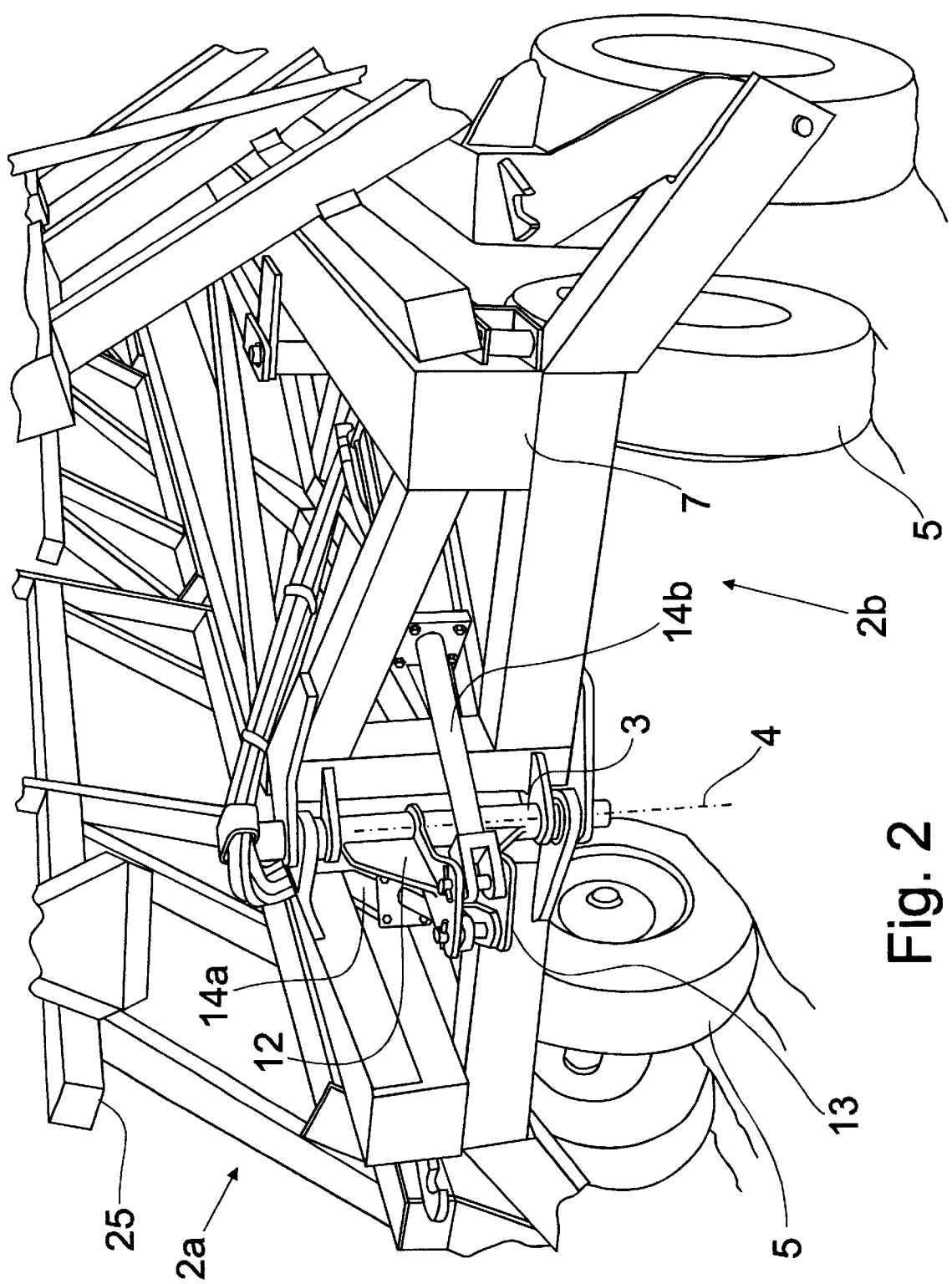
FIG. 2 is a partial enlarged right rear perspective view of the pivotal connection between the opposing frame sections oriented as shown in FIG. 1.
Figure 3:
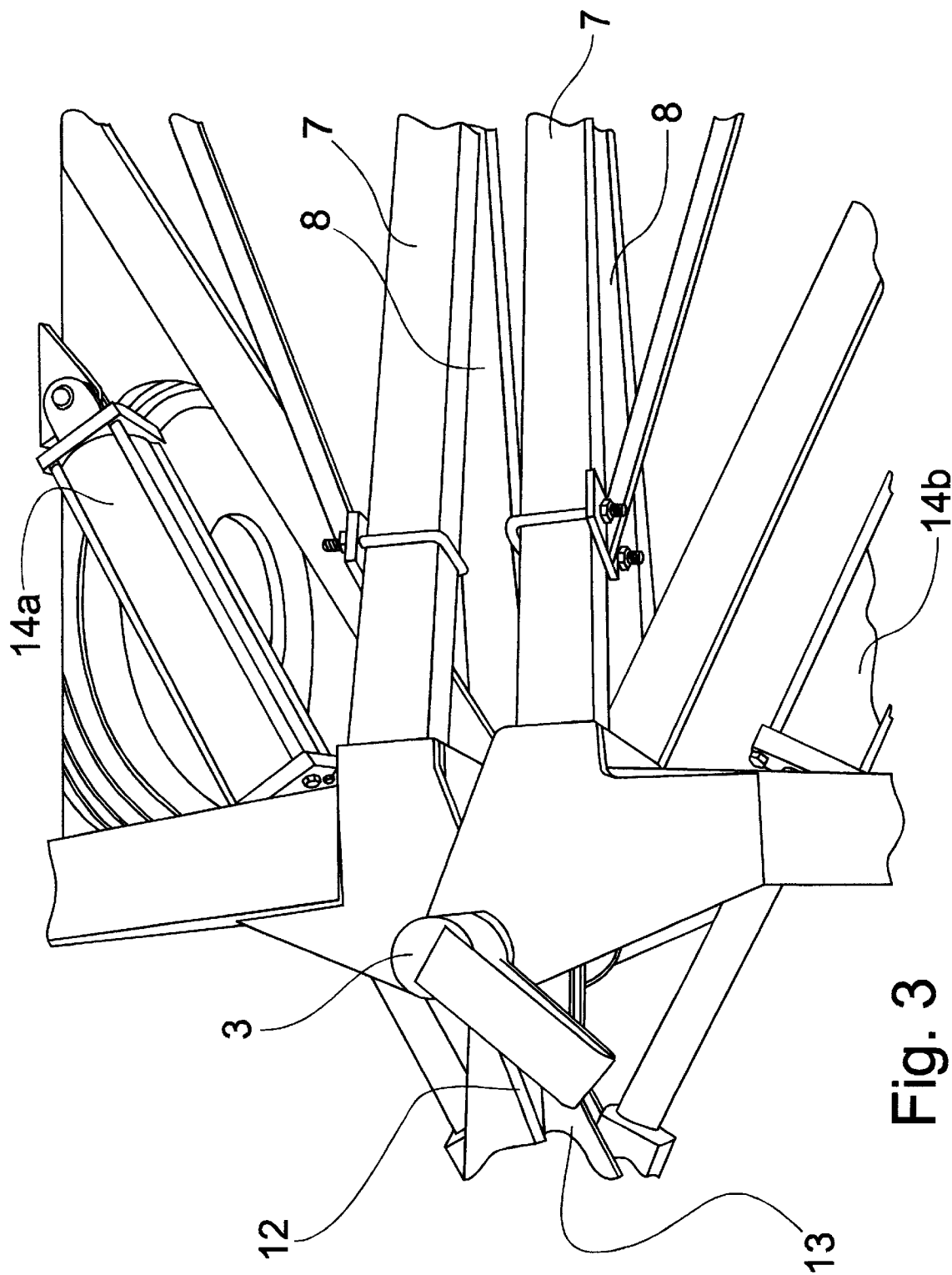
FIG. 3 is an enlarged partial top plan view of the rear pivotal connection shown in FIG. 2.

As shown in FIG. 2, the kingpost 3 defines a vertical pivot axis 4 about which the frame sections 2a, 2b pivot between working and transport positions. The kingpost 3 includes a rearwardly extending support bracket 12 to which is mounted a pair of hydraulic fold cylinders 14a, 14b interconnecting the support bracket 12 and the main frame member 7 of the respective frame sections 2a, 2b. Manipulation of the length of the hydraulic fold cylinders 14a, 14b controls the pivotal movement of the frame sections 2a, 2b between the forwardly folded transport position and the transversely extending working position.

Figure 4:
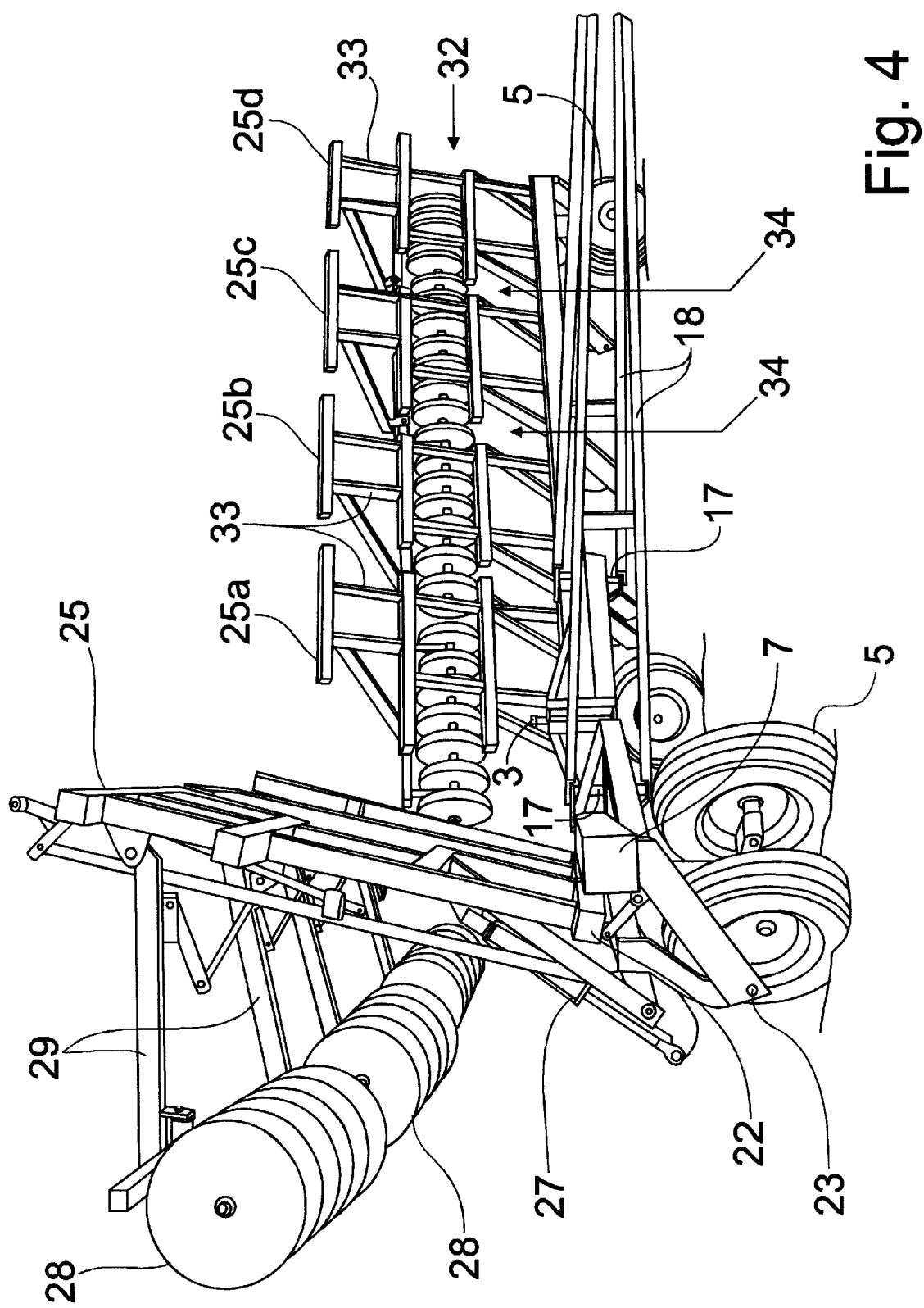
FIG. 4 is a right side elevational view of the tillage implement with the tool sub-frames being raised to a vertical transport position, the frame sections being partially folded from the working position.

Each frame section 2a, 2b also includes a pivotally connected hitch member 18 mounted at a pivot 17 on the main frame member 7 and extending forwardly therefrom to a hitch mechanism (not shown) for connection to a tractor or other prime mover 19 as best seen in FIG. 4.

Figure 6:
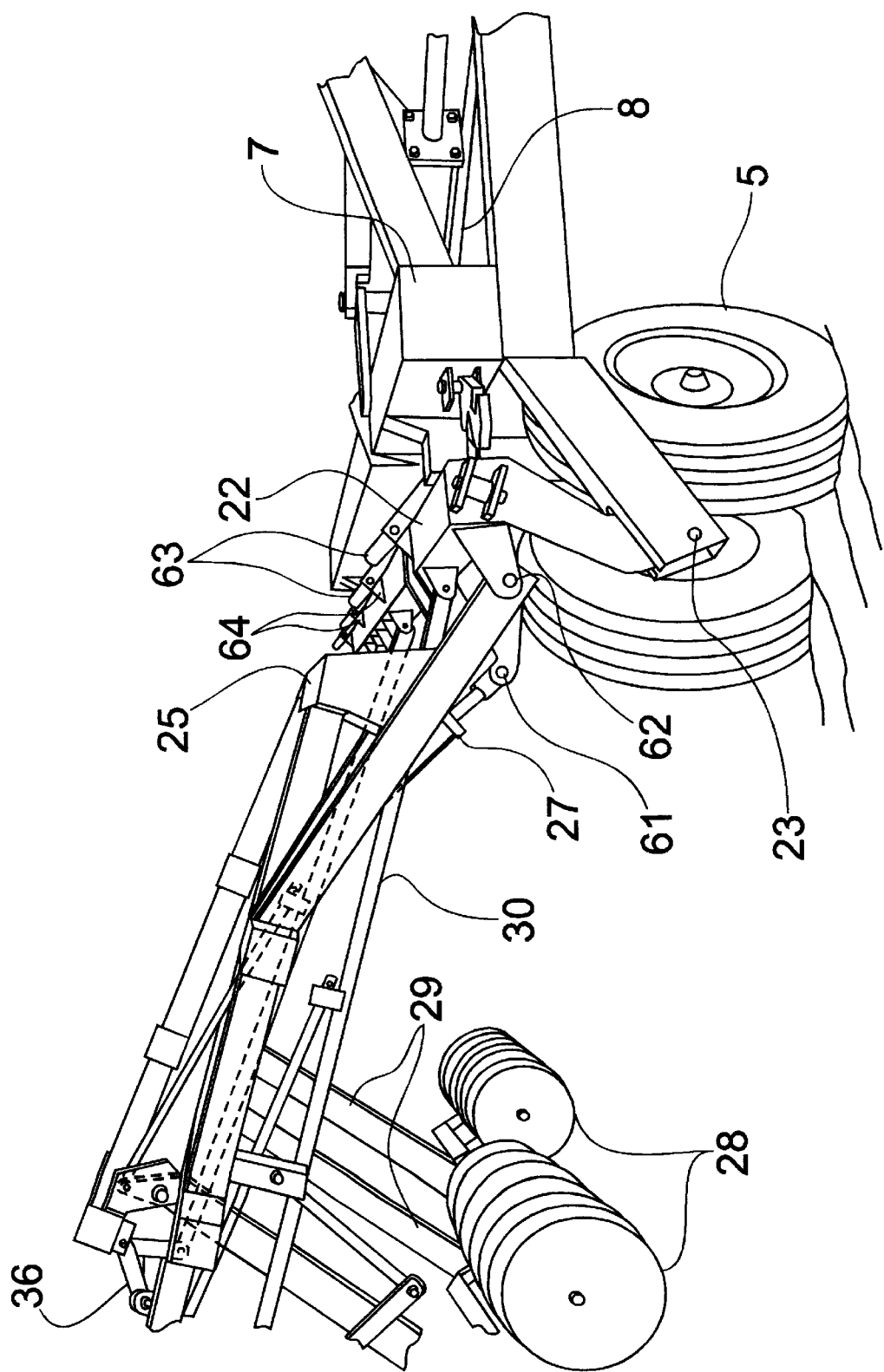
FIG. 6 is a partial right side perspective view of the left frame section with the tool sub-frames being partially raised upwardly toward a vertical transport position.

Each frame section 2a, 2b has mounted thereto rearwardly extending tool sub-frames 25 pivotally rotatable about a generally horizontally extending rockshaft 22 for movement between a lowered operating position, as shown in FIGS. 7 and 8, and a raised generally vertical non-working position, as shown in FIG. 1. The rockshaft 22 is pivotally attached at a pivot lug 23 extending rearwardly from the respective frame sections 2a, 2b and extends generally parallel to the main frame member 7 rearwardly thereof. Rotation of the tool sub-frames 25 fully into the non-working position, as seen in FIG. 6, places the tool sub-frames over center with respect to the rockshaft 22.

Additionally, each frame section 2a, 2b is provided with a plurality of tool sub-frames 25a–25d. The relative position of each sub-frame 25a–25d is controlled by a hydraulic lift cylinder 27 which determines the working height of the respective tool sub-frame 25a–25d above the ground by relative rotation of the tool sub-frame about the connection with the rockshaft 22. The rear of each tool sub-frame 25a–25d is supported above the ground by support wheel assemblies 28, as best seen in FIG. 4, connected to the tool sub-frame 25 by a pivoted connecting arm 29. The relative pivoted position of the connecting arm 29 is determined by a connecting link 30 connected to the rockshaft 22 to provide a fixed distance between the rockshaft 22 and the support wheel assembly 28 when the tool sub-frame 25 is pivoted by the hydraulic lift cylinder 27, as best shown in FIG. 6. As the tool sub-frames 25 are rotated about the rockshaft 22, the connecting link 30 operates through a linkage 36 to bring the support wheel assembly 28 into close proximity to the tool sub-frame 25 when placed into the upright non-working position.

Each tool sub-frame 25 independently floats on its own hydraulic lift cylinder 27 which are hydraulically connected in parallel with one another to provide a single hydraulic adjustment of the working height of the sub-frames 25a–25d together. The independent movement of any one particular sub-frame 25 forces hydraulic fluid through the corresponding lift cylinder to be shared between the remaining hydraulic lift cylinders 27, thereby providing for an independent floatational action of the sub-frames 25a–25d.

Each interior sub-frame 25a–25c, as seen in FIG. 4, provides for transverse rows of tool mounting positions 32. The sides 33 of the interior sub-frames 25a–25c are irregularly spaced from one another so as to provide for continuous tool coverage while allowing for access spaces 34 between each sub-frame 25. Preferably spaces 34 are straight sided due to the parallelogram shaping of the tool sub-frames 25.

Depth control for the tillage tools carried by the tool sub-frames 25 is accomplished through the rotation of the rockshaft 22 about its pivot lug 23. When in the lowered working position, as shown in FIGS. 7 and 8, the rockshaft 22 is free to pivot vertically about the horizontal pivot lug 23 through manipulation of the hydraulic cylinders 27. The mounting of the hydraulic cylinders 27 on the mounting arm 61 affixed to the rockshaft 22 provides a mechanical advantage with respect to the pivotal connection of the tool sub-frames 25 at pivot 62 carried by the rockshaft 22. Accordingly, the expansion and contraction of the hydraulic cylinders 27, acting in concert due to the parallel hydraulic connection thereof, causes a corresponding rotation of the rockshaft 22 about its pivot lug 23, which in turn raises and/or lowers respectively the front pivotal connection 62 of the tool sub-frames 25 to the rockshaft 22. The connecting link 30 serves to complete a four-bar linkage with respect to the tool sub-frame 25 and causes the rear of the sub-frame supported by the support wheel assembly 28 to raise and/or lower a corresponding amount, thus keeping the sub-frame generally parallel to the ground and effecting a corresponding depth control for the tillage tools. The pin 66 at the inner end of the right rockshaft 22 is engageable with the slotted bracket 67 at the inner end of the left rockshaft 22 to connect the movements of the rockshafts 22 when in the operating position, thus assuring a uniform depth control across the entire width of the implement 1. The open slotted bracket 67 is free to disengage from the pin 66 whenever the frame sections 2a, 2b are folded forwardly to the transport position.

To raise the tool sub-frames 25 into their generally vertical transport position, the hydraulic cylinders 27 are completely retracted, thereby raising the tool sub-frames 25 to their maximum operating height whereupon the locking levers 63 engage locking members 64 mounted on top of the rockshaft 22 to secure the rockshaft in an immobilized position in which the locking levers 63 restrain the pivotal movement of the rockshaft 22 about the pivot lug 23. A subsequent extension of the hydraulic cylinders 27 will then push against the immobilized rockshaft 22 and cause the tool sub-frames 25 to pivot vertically about the pivots 62 until reaching the fully raised transport position shown in FIGS. 1 and 4. Once the tool sub-frames 25 have been lowered back to the maximum raised operating position, the rockshaft 22 is freed from the restraint imposed by the locking levers 63 by manually grasping one of the locking levers and disengaging the corresponding locking member 64. The cross link 65 interconnects all of the locking levers 63 on each frame section 2a, 2b, allowing the movement of one lever to disengage the entire set of locking levers 63 from the members 64. The tool sub-frames 25 are then free to move throughout the permissible range of working movement to control the operating depth of the tillage tools.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. An agricultural implement frame connectable to a prime mover for movement along a direction of travel, said implement frame being convertible between an operative configuration and a transport configuration, comprising:
   a pair of frame assemblies upon which a plurality of ground working tools may be mounted, said frame assemblies being oriented transverse to said direction of travel when in said operative configuration and generally parallel to said direction of travel when in said transport configuration, said frame assemblies having an inner end and a distal outer end;
   a pivot mechanism positioned between said frame assemblies so as to pivotally connect said inner ends of said frame assemblies such that said frame assemblies fold forwardly with said outer ends being forwardly of said inner ends when said frame assemblies are in said transport configuration;

a hitch mechanism pivotally connected to said frame assemblies and extending forwardly thereof for connection with said prime mover; and first ground engaging wheel assemblies supporting said inner ends of said frame assemblies and second ground engaging wheel assemblies supporting said outer ends of said frame assemblies, said hitch mechanism being devoid of ground engaging wheels for support thereof, said second wheel assemblies being mounted for castering movement, said first wheel assemblies being steered for proper orientation thereof when in said operating and transport configurations, both said first and second wheel assemblies remaining engaged with the ground to support said inner and outer ends, respectively, of said frame assemblies when placed in said transport configuration; and wherein said pivot mechanism includes a mounting tongue projecting rearwardly of a pivot axis, each said frame assembly including a hydraulic fold cylinder connected to said mounting tongue to effect pivotal movement of the corresponding said frame assembly about said pivot axis.

2. The implement frame of claim 1, wherein said ground working implements are supported by sub-frame assemblies, each said sub-frame assembly being independently movable relative to said frame assemblies and relative to each other sub-frame assembly.

3. The implement frame of claim 2, wherein said inner ends of said frame assemblies abut one another when in said operative configuration.

4. The implement frame of claim 3, wherein said pivot mechanism includes a mounting tongue projecting rearwardly of a pivot axis, each said frame assembly including a hydraulic cylinder connected to said mounting tongue to effect pivotal movement of the corresponding said frame assembly about said pivot axis.

5. An agricultural implement frame connectable to a prime mover for movement along a direction of travel, said implement frame being convertible between an operative configuration and a transport configuration, comprising:

a pair of frame assemblies oriented transverse to said direction of travel when in said operative configuration and a generally parallel to said direction of travel when in said transport configuration, said frame assemblies having an inner end and a distal outer end;

a pivot mechanism positioned between said frame assemblies so as to pivotally connect said inner ends of said frame assemblies such that said frame assemblies fold forwardly with said outer ends being forwardly of said inner ends when said frame assemblies are in said transport configuration;

a plurality of sub-frame assemblies supported from each said frame assembly, each said sub-frame assembly having mounted thereon a ground working tool, each said sub-frame assembly being independently movable relative to said frame assemblies and relative to each other sub-frame assembly so that the corresponding said ground engaging tool can follow ground undulations, said sub-frame assemblies being generally horizontal when in said operating configuration and generally vertical in said transport configuration, said sub-frame assemblies being pivotally moved to said vertical transport configuration to elevate said ground engaging tools above the ground;

a hitch mechanism pivotally connected to said frame assemblies and extending forwardly thereof for connection with said prime mover; and ground engaging wheels supporting said inner ends of said frame assemblies and said outer ends of said frame assemblies for movement thereof over the ground, said ground engaging wheels corresponding to both said inner and outer ends of both said frame assemblies remaining engaged with the ground when placed into said transport configuration; and wherein said pivot mechanism includes a mounting tongue projecting rearwardly of a pivot axis, each said frame assembly including a hydraulic fold cylinder connected to said mounting tongue to effect pivotal movement of the corresponding said frame assembly about said pivot axis.

6. The implement frame of claim 5, wherein said ground engaging wheels include a first set of ground engaging wheels supporting said inner ends of said frame assemblies and a second set of ground engaging wheels supporting said outer ends of said frame assemblies, said hitch mechanism being devoid of ground engaging wheels for support thereof.

7. The implement frame of claim 6, wherein said inner ends of said frame assemblies abut one another when in said operative configuration.

8. The implement frame of claim 5, wherein said sub-frame assemblies are pivotally supported on a rockshaft, each said sub-frame assembly having a hydraulic attitude cylinder connected to said rockshaft to effect vertical movement of said sub-frame assemblies relative to the corresponding said frame assembly.

9. The implement frame of claim 8, wherein each said sub-frame assembly includes a rearward support arm pivotally connected to a sub-frame member and a connecting arm controlling the orientation of said support arm relative to said sub-frame member as a function of the vertical orientation of said sub-frame assembly relative to the corresponding said frame assembly.

10. The implement frame of claim 9, wherein all of said hydraulic attitude cylinders corresponding to a common frame assembly are connected in parallel so as to provide a single hydraulic adjustment of said ground engaging tools relative to the ground to define a working height.

11. An agricultural implement frame connectable to a prime mover for movement along a direction of travel, said implement frame being convertible between an operative configuration and a transport configuration, comprising:

a pair of frame assemblies oriented transverse to said direction of travel when in said operative configuration and generally parallel to said direction of travel when in said transport configuration, said frame assemblies having an inner end and a distal outer end;

a pivot mechanism positioned between said frame assemblies so as to define a pivot axis for pivotally connecting said inner ends of said frame assemblies such that said frame assemblies fold forwardly with said outer ends being forwardly of said inner ends when said frame assemblies are in said transport configuration;

a plurality of sub-frame assemblies supported from each said frame assembly, each said sub-frame assembly having mounted thereon a ground working tool, each said sub-frame assembly being independently movable relative to said frame assemblies and relative to each other sub-frame assembly so that the corresponding said ground engaging tool can following ground undulations, said sub-frame assemblies being pivotally supported on a rockshaft, each said sub-frame assembly having a hydraulic attitude cylinder connected to said rockshaft to effect vertical movement of said sub-frame assemblies relative to the corresponding said frame assembly, each said sub-frame assembly including a rearward support arm pivotally connected to a sub-frame member and a connecting arm controlling the orientation of said support arm relative to said sub-frame member as a function of the vertical orientation of said sub-frame assembly relative to the corresponding said frame assembly;

a mounting tongue projecting rearwardly of a pivot axis, each said frame assembly including a hydraulic fold cylinder connected to said mounting tongue to effect pivotal movement of the corresponding said frame assembly about said pivot axis;

a hitch mechanism pivotally connected to said frame assemblies and extending forwardly thereof for connection with said prime mover; and ground engaging wheels supporting said inner ends of said frame assemblies and said outer ends of said frame assemblies for movement thereof over the ground.

12. The implement frame of claim 11, wherein said mounting tongue supports first and second transversely spaced pivots for the mounting of said hydraulic fold cylinders that provide a mechanical leverage to effect the pivotal movement of said frame assemblies about said pivot axis.

13. The implement frame of claim 11, wherein all of said hydraulic attitude cylinders corresponding to a common frame assembly are connected in parallel so as to provide a single hydraulic adjustment of said ground engaging tools relative to the ground to define a working height.

14. The implement frame of claim 13, wherein said ground engaging wheels include a first set of ground engaging wheels supporting said inner ends of said frame assemblies and a second set of ground engaging wheels supporting said outer ends of said frame assemblies, said hitch mechanism being devoid of ground engaging wheels for support thereof.

15. The implement frame of claim 14, wherein said first set of ground engaging wheels are steered for proper orientation thereof when in said operating and transport configurations, said second set of ground engaging wheels being mounted for castering movement.

16. The implement frame of claim 15, wherein each said frame assembly includes a first and second generally parallel frame members extending transversely to said direction of travel when in said operating configuration, said first and second frame members being joined at said inner end by a first cross frame member and at said outer end by a second cross frame member.

17. The implement frame of claim 16, wherein said first cross frame members abut one another when in said operative configuration to resist the draft forces incurred by said ground working tools.

* * * * *